United States Patent [19]

Hastings

[11] 4,311,561
[45] Jan. 19, 1982

[54] APPARATUS FOR EXTRACTING BITUMEN FROM TAR SAND

[75] Inventor: Larry W. Hastings, Owensboro, Ky.

[73] Assignee: Tarco Incorporated, Owensboro, Ky.

[21] Appl. No.: 136,748

[22] Filed: Apr. 2, 1980

[51] Int. Cl.³ .................. B01D 11/02; C10B 1/18; C10B 3/08
[52] U.S. Cl. .................. 196/14.52; 202/169; 202/170; 422/269; 422/273; 422/280; 422/281; 422/283
[58] Field of Search ........... 196/14.52; 208/11 LE; 422/269, 273, 280, 281, 283; 202/168–170

[56] References Cited

U.S. PATENT DOCUMENTS

| | | | |
|---|---|---|---|
| 1,024,230 | 4/1912 | Flood | 422/273 |
| 1,862,945 | 6/1932 | Schlotterhose | 422/273 |
| 2,377,136 | 5/1945 | Dinley et al. | 422/280 |
| 3,226,202 | 12/1965 | Nagelvoort | 422/281 |
| 3,856,474 | 12/1974 | Pittman et al. | 196/14.52 |
| 3,941,679 | 3/1976 | Smith et al. | 208/11 LE |
| 4,120,775 | 10/1978 | Murray et al. | 422/281 |

*Primary Examiner*—Bradley Garris
*Attorney, Agent, or Firm*—Kerkam, Stowell, Kondracki & Clarke

[57] ABSTRACT

A method and apparatus for extracting bitumen from tar sand utilizes a plurality of individually sealed pressure adjusted interconnected extraction chambers in which the tar sand flows countercurrent to the flow of solvent with mixing in each extraction chamber of solvent and tar sand. Tar sand is provided to the first of the extraction chambers and after removal of a portion of the bitumen is carried by a conveyor and disposed into the next chamber where further bitumen is extracted and so on through the plurality of chambers until all the bitumen is extracted and the sand and remaining solvent then conveyed into a last chamber where the sand and solvent is treated with hot water to remove solvent and pure sand is discharged.

5 Claims, 12 Drawing Figures

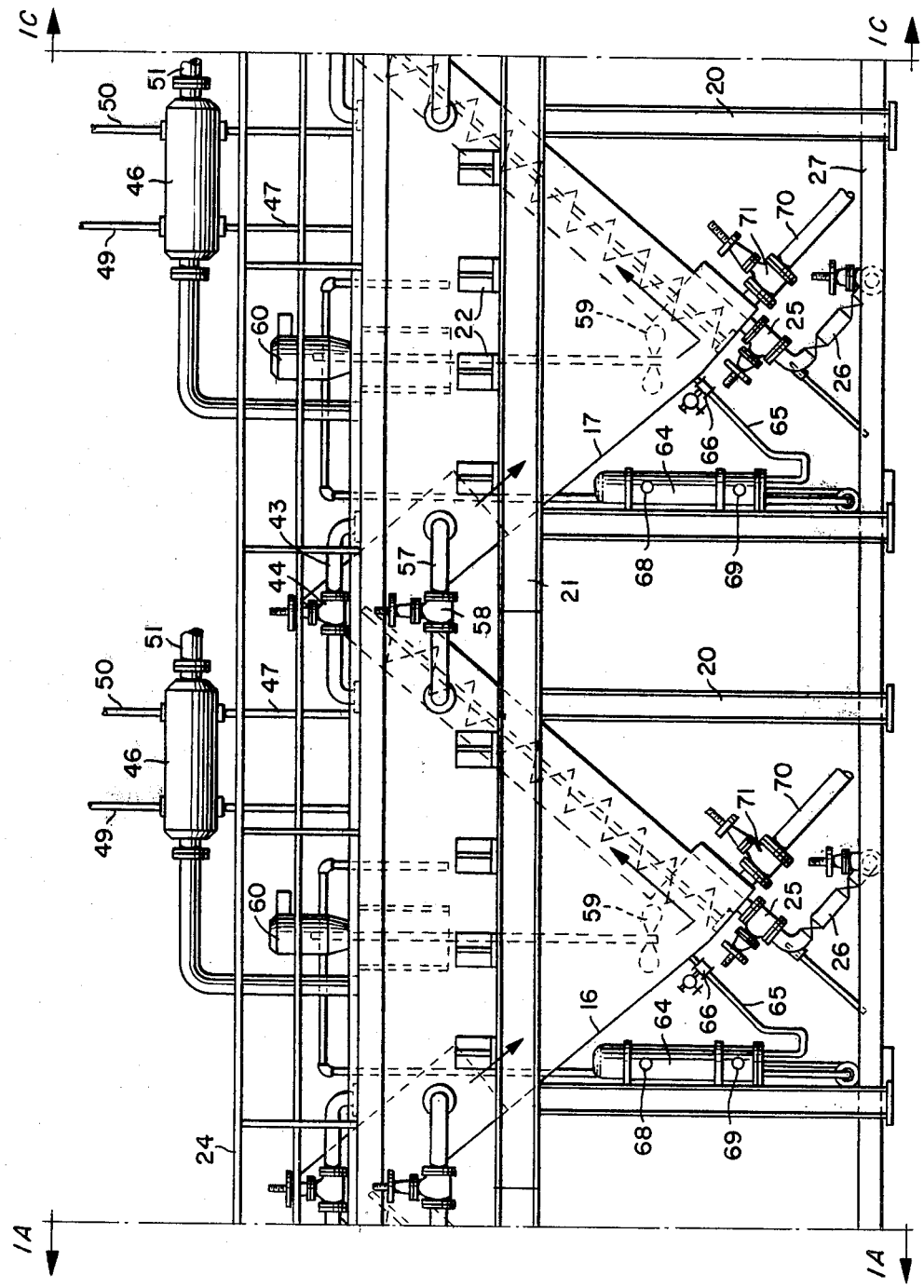

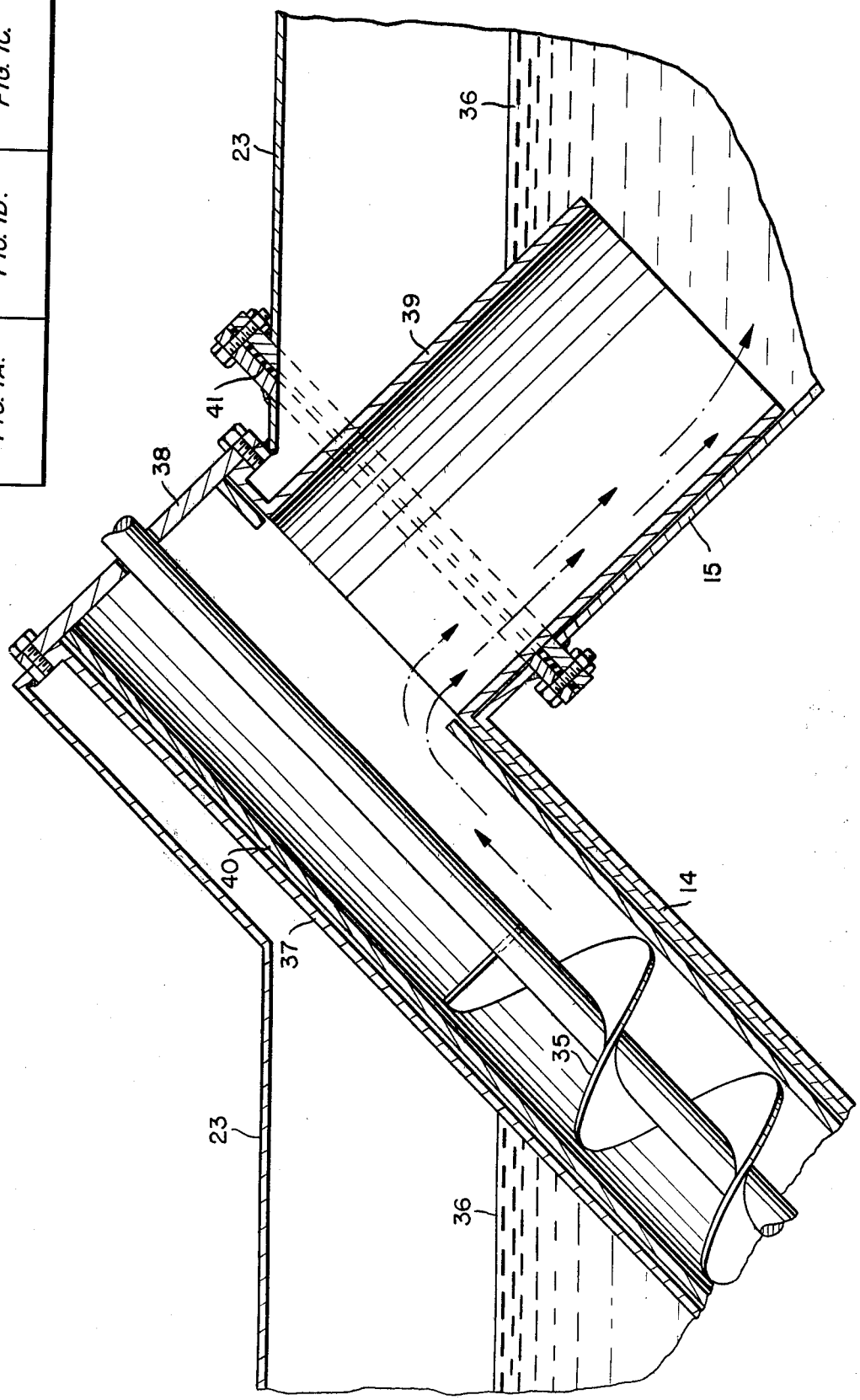

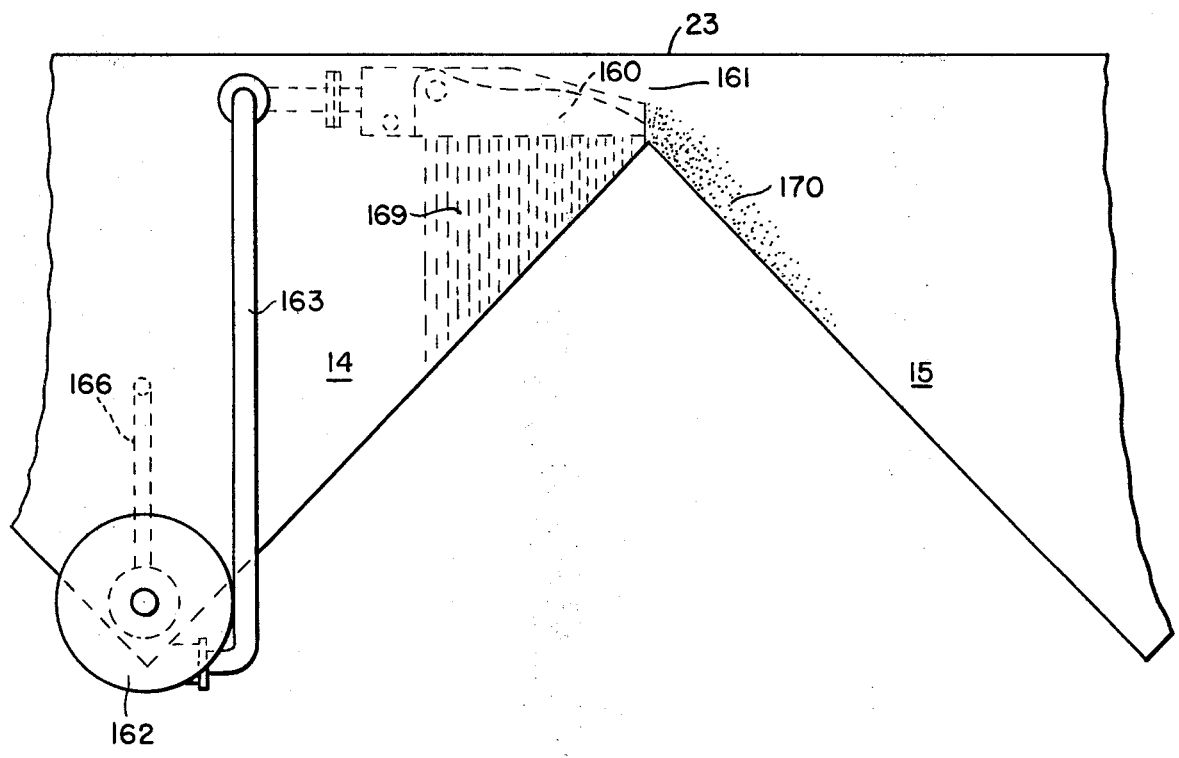
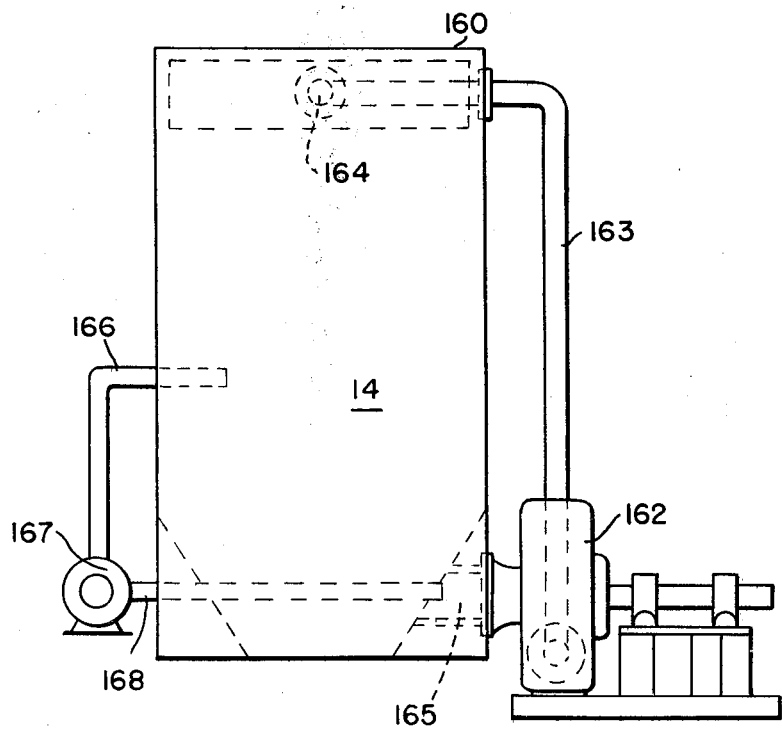

4,311,561

APPARATUS FOR EXTRACTING BITUMEN FROM TAR SAND

BACKGROUND OF THE INVENTION

Prior patents providing the background of development in the removal of bitumen from tar sand are:
U.S. Pat. No. 3,941,679—(1976) Smith et al
U.S. Pat. No. 4,120,775—(1978) Murray et al
U.S. Pat. No. 3,856,474—(1974) Pittman et al
U.S. Pat. No. 1,862,945—(1932) Schlotterhose
U.S. Pat. No. 1,024,230—(1912) Turner et al The patent to Smith utilizes a three stage apparatus for separating hydrocarbonaceous substances from tar sand. The tar sand is first placed in an inclined reactor 20 having auger type conveyor 30 located therein. Solvent from nozzles 28 is sprayed onto the tar sand forming a slurry. The mixture is then conveyed to a second inclined reactor, also having an auger conveyor, where a diluted solvent is sprayed onto the slurry from nozzles 38. The tar sand is then conveyed to a third reactor 26 having an inclined auger conveyor 48. Full strength solvent is sprayed from nozzles 51 onto the tar sand removing the last of the hydrocarbons from the sand. The mixture of solvent and hydrocarbons is withdrawn from the lower end of reactors 24 and 26. The solvent is then distilled and recycled to stages one and three while the remaining bitumen is left to be processed.

Murray describes apparatus for recovering bitumen from tar sand in which the tar sand is fed to an inclined screw conveyor 24 where it is elevated while simultaneously being washed by a liquid hydrocarbon solvent. From the first inclined conveyor the sand is deposited on a second inclined conveyor 30 where steam is applied to wash the remaining solvent from the sand. The mixture of solvent and bitumen is continuously pumped from a conduit C to a centrifuge 14 then to a solvent recovery column 17 where the solvent is distilled and recycled while the bitumen is removed.

Pittman discloses a five stage apparatus for recovering bitumen from tar sand where the tar sand is conveyed by an endless belt 14 past a series of nozzles 26 which spray solvent onto the tar sand as it passes. The mixture of bitumen and solvent falls through holes in the conveyor belt into compartments Q–W. Each compartment Q–W contains an increasingly stronger mixture of solvent and bitumen, Q having the weakest, W the strongest. The mixture cascades from one compartment to the next until the strongest mixture which is in compartment W is withdrawn by a pump through conduit 48 to a collector where the solvent is distilled and recycled while the bitumen is left.

Schlotterhose and Turner show that it is well known in the art of liquid extraction to convey a solid through a series of inclined screw conveyors while simultaneously providing a counter flow of solvent.

The present method and apparatus while utilizing certain known features of this prior art combines them in an entirely novel and unexpected combination providing efficiency in the extraction of bitumen which could not be foreseen by one skilled in the art at minimum cost in view of the maximum recovery of solvent in the closed systems of the present invention for continuous use and recirculation in the apparatus.

BRIEF SUMMARY OF THE INVENTION

Method and apparatus for extracting bitumen from tar sand flows the tar sand and solvent in one direction through a plurality of interconnected individually sealed extraction chambers with the flow of extracted bitumen and solvent counter to the flow of tar sand and solvent. The amount of bitumen in the tar sand is progressively reduced from reaction chamber to reaction chamber until the final chamber where sand and solvent alone are treated with hot water to remove the solvent and then discharge pure sand. Solvent vapor in each chamber is condensed and returned for use in the system and each chamber is connected to the next adjacent chamber in the series for the equalization of vapor pressure throughout the several chambers and to provide the countercurrent flow of bitumen and solvent from one chamber to the next. Each of the extraction chambers is provided with an agitator for the mixture of tar sand and solvent and also with a circulating system for bringing solvent and bitumen solution from the top of the chamber for discharge into the bottom of the chamber adjacent the agitator with a heat exchanger to adjust the temperature of the bitumen and solvent solution. Each chamber is also provided with means for removing water collecting at the bottom thereof and this system also separates the solvent from the water for recirculation of the solvent. Each of the extraction chambers is also provided with means for charging each chamber prior to the practice of the method and the use of the apparatus and for discharging each chamber as may be required. The richest mixture of solution in bitumen is removed from the first of the chambers in the series of chambers for removal of slit and the separation of bitumen from solvent with the solvent returned for further use in the method and the apparatus. The tar sand and solvent is removed from each chamber and discharged into the next chamber in the series of chambers by a conveyor extending from adjacent the bottom of each chamber to the top thereof while the tar sand at the top of each conveyor acts as a seal between the adjacent chambers.

BRIEF DESCRIPTION OF THE DRAWINGS

In the accompanying drawings, in which like referenced characters indicate like parts, a preferred embodiment of the apparatus for carrying out the method of the invention is disclosed as well as an alternate conveying apparatus for use therewith. With reference then to the drawings.

FIG. 1B is a vertical view of the apparatus next adjacent and connecting to that of FIG. 1A;

FIG. 2 is an enlarged detail of the upper end of a conveyor in an extracting chamber showing discharge therefrom to the next adjacent chamber;

FIG. 3 shows the relationship of FIGS. 1A, 1B, and 1C;

FIG. 9 is a vertical view of alternative structure for conveying tar sand and solvent from one extraction chamber to the next; and FIG. 10 is a view of the structure of FIG. 9 as seen from the left in FIG. 9.

DESCRIPTION OF THE PREFERRED EMBODIMENT

Figure 1A:
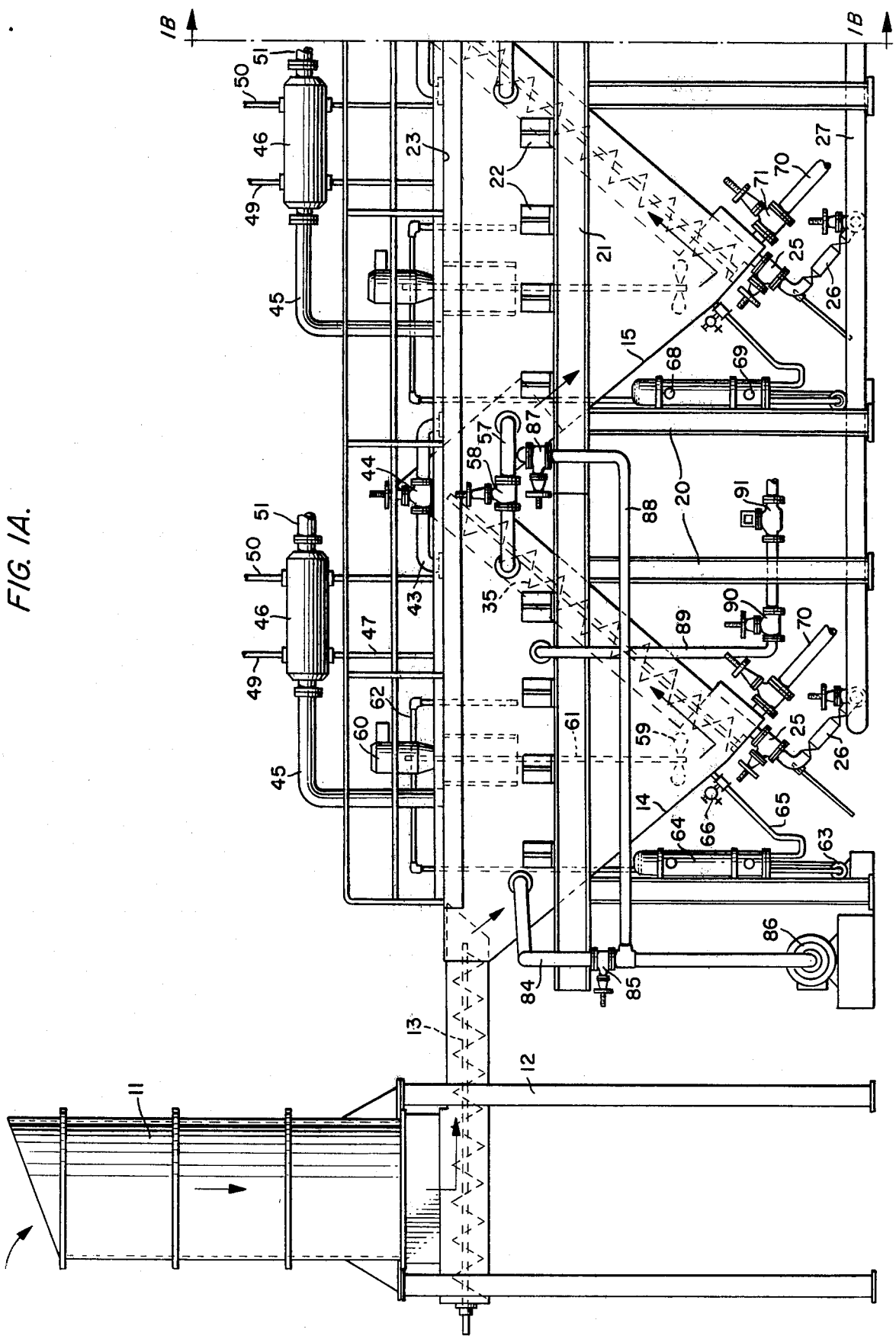
FIG. 1A is a vertical view of a portion of the apparatus of the preferred embodiment.
Figure 1C:
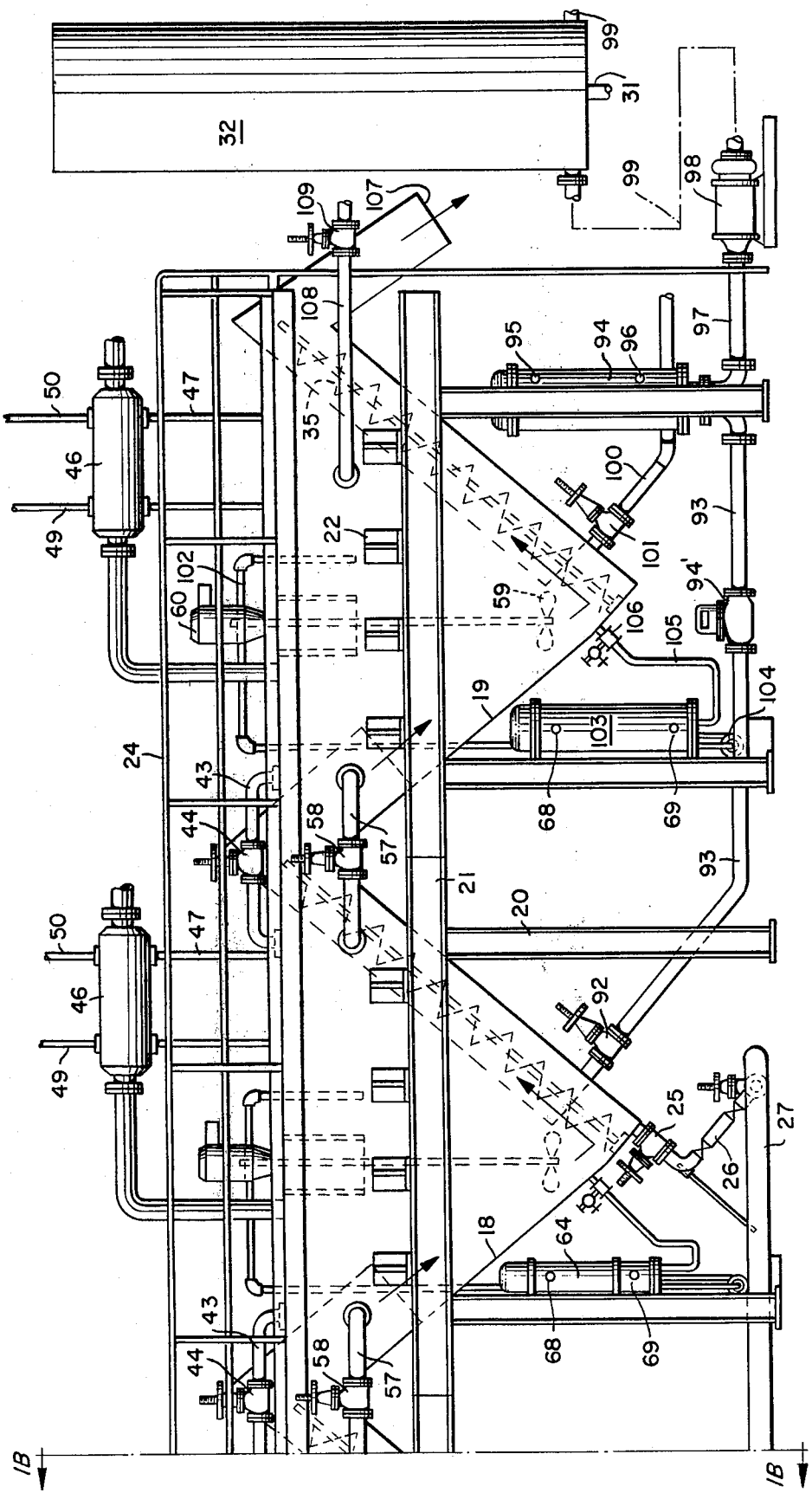
FIG. 1C is a vertical view of apparatus next adjacent to and connecting with that of FIG. 1B.

Referring now to FIGS. 1A, 1B and 1C, a hopper 11 for tar sand is mounted on suitable supports 12 for gravity discharge into conveyor 13 which conveyor 13 discharges into the first of a series of extraction chambers 14, 15, 16, 17 and 18 while chamber 19 is utilized to strip the solvent from the sand from which the bitumen has been removed. The several chambers 14–19 are suitably supported by a framework comprising vertical pillars 20 supporting in turn horizontal stringers 21 on which the chambers are suspended as by brackets 22. The tops 23 of the chambers seal them from atmosphere and also provide a walkway for workmen and support a railing 24 for purposes of safety.

Figure 8:
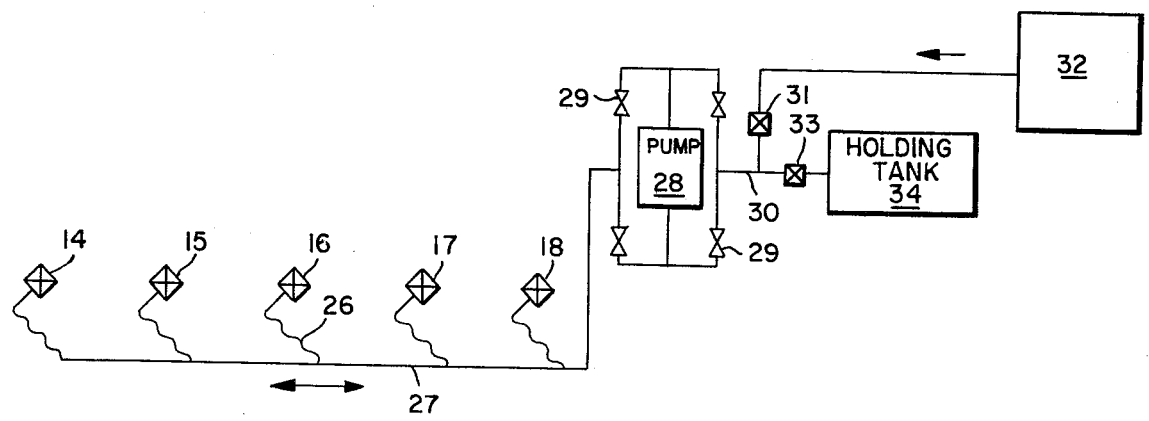
FIG. 8 is a schematic piping diagram for filling and emptying each of the extraction chambers.

Each of the chambers 14–18 is loaded with a mixture of tar sand and solvent in the approximate ratio of one third sand to two thirds solvent prior to the commencement of the method and the use of the apparatus of the present invention utilizing the system shown in FIG. 8 where a bottom portion of each of the tanks is shown connected by suitable valving and piping 25 and 26, respectively, to conduit 27 which in turn is connected to pump 28 through valving generally indicated at 29 so that the same system may also be used for discharge of the chambers. Pump 28 is connected by piping 30 and valve 31 to solvent tank 32 and by valve 33 to a holding tank 34 for tar sand. During use of the apparatus for the extraction of bitumen, valves 25 are normally closed and the system of FIG. 8 is not utilized.

Each compartment 14–18 is provided with a conveyor 35 for raising tar sand and solvent from adjacent the bottom of each compartment to the top thereof for discharge to the next adjacent compartment to the right as seen in these figures. The enlarged detail of FIG. 2 shows the upper end of one such conveyor 35 as, for example, disposed in chamber 14 for discharge of tar sand and solvent into adjacent chamber 15. The liquid level in the chambers is shown at 36 and it will be seen that the tar sand lifted by the conveyor 35 working in its housing 37 will pack the tar sand adjacent end 38 before the tar sand and solvent falls by gravity in the direction of the arrows through discharge 39 into chamber 15. Housing 37 may be provided with an internal wear surface 40 and for ease in assembly, a joint and seal is provided at 41 between the chambers. The packing of the tar sand, as referred to above, forms a seal to prevent liquid and vapor in countercurrent flow to that of the tar sand from entering the conveyor.

Figure 5:
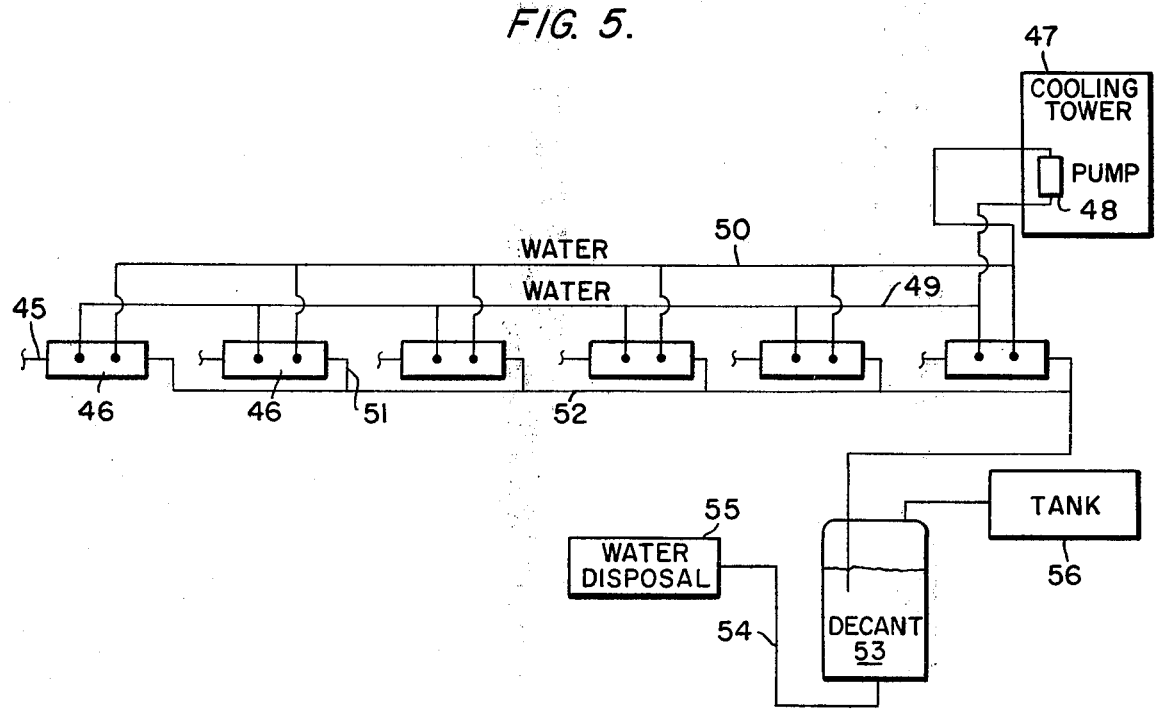
FIG. 5 is a schematic piping diagram for the several condensers utilized with the extracting chambers for condensing vaporized solvent for reuse.

Adjacent chambers such as chambers 14 and 15 are interconnected through the top thereof by pipe 43 and valve 44 to equalize the vapor pressures throughout the several chambers. Also opening through the top of each chamber is a pipe 45 leading to a water cooled condenser 46 which is supported on top 23 by standards 47 for removal of solvent vapor from the chamber and condensation thereof for re-use. FIG. 5 shows schematically the piping arrangement for the several condensers 46 in which cooled water is conducted from cooling tower 47 by pump 48 through piping 49 to each of the condensers and from each condenser the heated water is returned by conduit 50 to the cooling tower. The condensed solvent is taken by pipe 51 from each of the condensers to conduit 52 which connects to decant chamber 53 where water is removed by pipe 54 to disposal 55 and solvent are collected in tank 56.

Each of tanks 14–18 is connected to the next adjacent tank at liquid level 36 by pipe 57 and valve 58 to provide for the flow of solution of solvent and bitumen to the left as seen in these figures and countercurrent to the movement of tar sand and solvent.

A mixer or agitator 59 is provided adjacent the bottom of each of chambers 14–19 and is driven by a suitable motor 60 mounted on top 23 through shaft 61. It will be noted that mixer 59 is disposed adjacent the lower end of conveyor 35.

Figure 6:
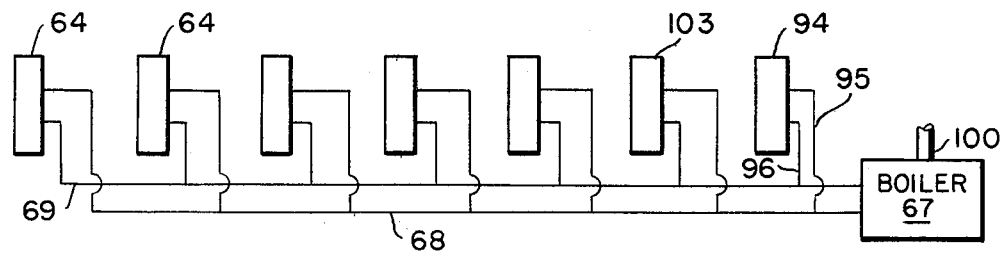
FIG. 6 is a schematic piping diagram for the several heat exchangers utilized with the extraction chambers.

An overflow pipe 62 extends through the top 23 of each of the chambers 14–19 to a pump 63 which forces the overflow of solution of solvent and bitumen through a heat exchanger 64 and after heating the bitumen and solvent is discharged through pipe 65 and control valve 66 into the bottom of the chamber for admixture with the tar sand and solvent by mixer 59. A schematic piping arrangement for the several heat exchangers used with the present invention is shown in FIG. 6 where a boiler 67 provides steam to line 68 and condensate is returned to boiler 67 through line 69.

Figure 4:
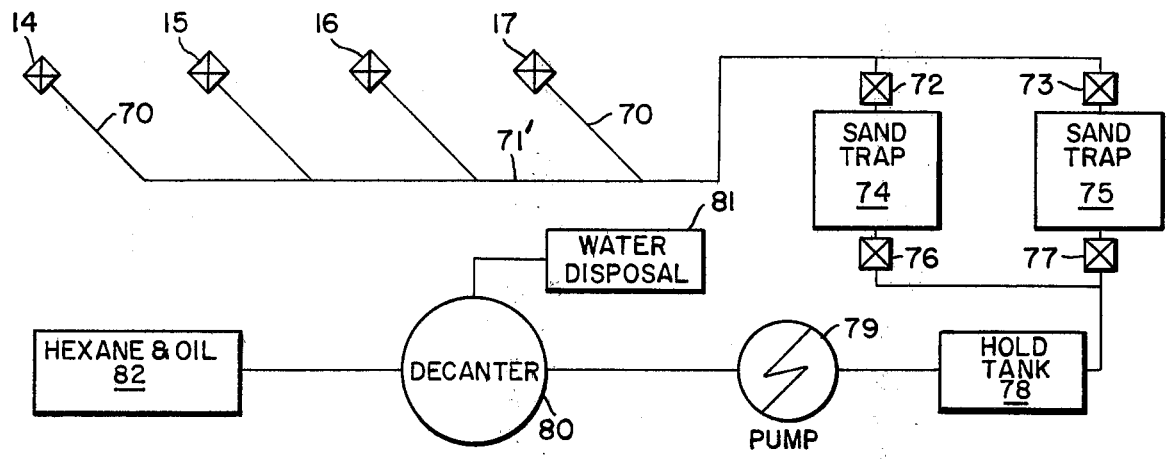
FIG. 4 is a schematic piping arrangement for water removal from the extraction chambers.

Water and any admixture of solvent and bitumen therewith is withdrawn from each of the chambers 14–17 by pipe 70 controlled by valve 71 and a schematic piping arrangement for this purpose is shown in FIG. 4. The several pipes 70 connect to a conduit 71' which discharge through valves 72 and 73 into sand traps 74 and 75 disposed in parallel and discharging, respectively, through valves 76 and 77 into a holding tank 78. A pump 79 is suitably connected to tank 78 and moves the water to decant chamber 80 where any water is discharged to water disposal 81 and the bitumen and solvent mixture is discharged to tank 82.

The solution of solvent enriched in bitumen is taken from the top of chamber 14 adjacent liquid level 36 by pipe 84 through control valve 85 by pump 86 which supplies the bitumen and solvent solution to a silt removal system as will be more fully described hereinafter. Enriched bitumen and solvent solution may also be taken from adjacent liquid level 36 of tank 15 through valve 87 and pipe 88 which connects into pipe 84 below valve 85 and thus to pump 86.

A solvent supply line 89 opens into the top of tank 14 adjacent liquid level 36 and connects through valve 90 and flow meter 91 with solvent supply tank 32 for control of solvent in the bitumen solvent solution removed from compartment 14 by pump 86. Pure solvent is also supplied to adjacent the bottom of chamber 18 through valve 92 and conduit 93 in which flow meter 94' is connected. Conduit 93 leads to a solvent preheater 94 which heats the solvent to $110° \pm 15°$ F. and is connected into the heat exchanger system of FIG. 6 by pipes 95 and 96. Preheater 94 is connected by pipe 97 to pump 98 which connects to the solvent storage tank 32 through pipe 99.

Hot water is provided to adjacent the bottom of chamber 19 by pipe 100 and the flow is adjusted by valve 101. Pipe 100 connects to the heating system of FIG. 6 as shown here. Hot water and solvent are taken from the top of chamber 19 by overflow pipe 102 to the water heat 103 by pump 104 for reheating to $180° \pm 15°$ F. and then for discharge through pipe 105 and control valve 106 into the bottom of chamber 19 for further removal of solvent from the sand.

After removal of the solvent from the sand in chamber 19, conveyor 35 therein moves the purified sand to discharge at 107. Additional water may be supplied to chamber 19 as required through pipe 108 controlled by valve 109 and connecting to a suitable source of water.

Figure 7:
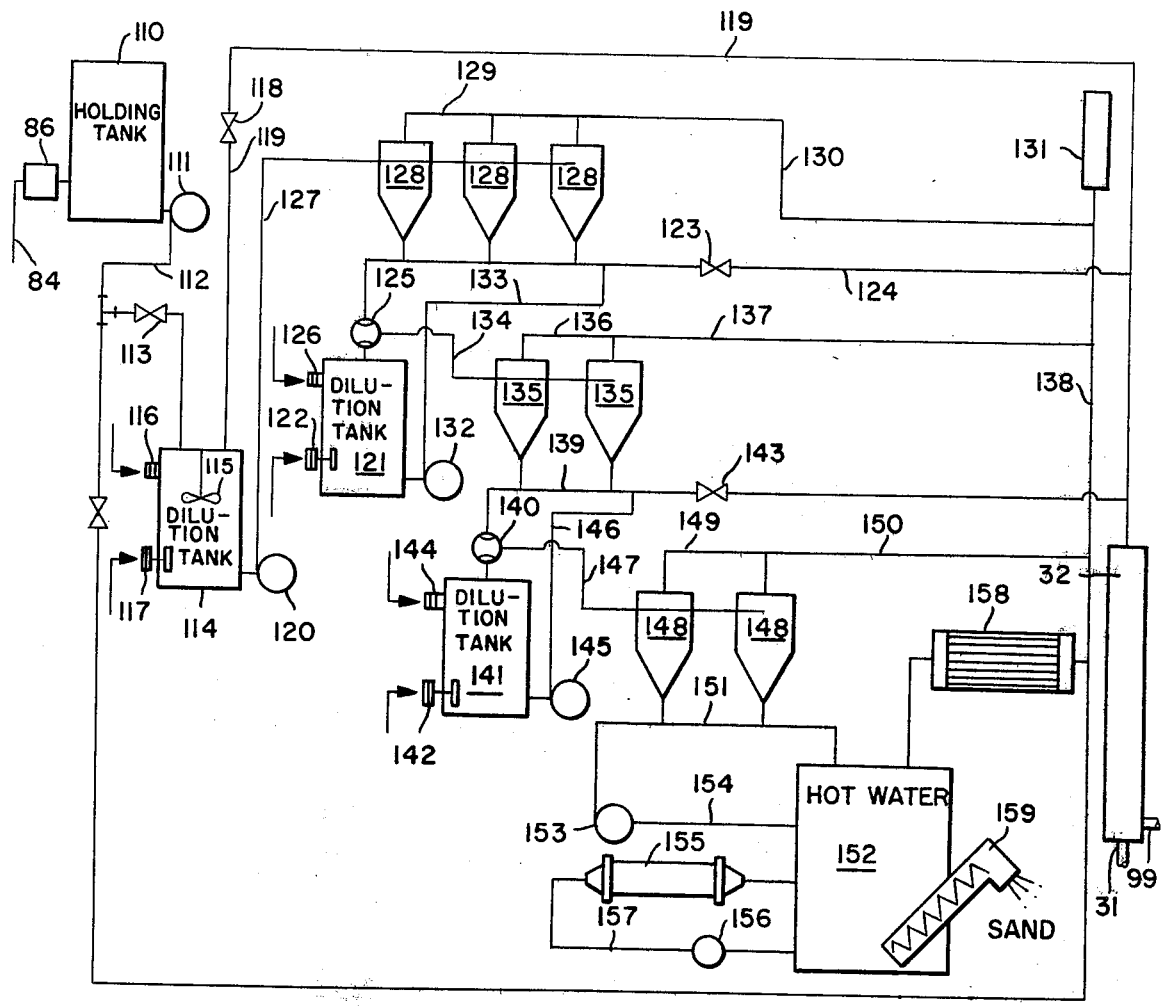
FIG. 7 schematically shows the arrangement of cleaners for desilting the bitumen and solvent mixture and for recovery of the solvent for reuse.

The solvent and bitumen solution is led from the upper portion of chamber 14 by pipe 84 through pump 86 (FIG. 1) to holding tank 110 (FIG. 7). The bitumen and solvent mixture is taken from holding tank 110 by pump 111 through pipe 112 and valve 113 to dilution tank 114 which is provided with a powered mixer 115. Level control valve 116 actuates valve 113 for proper height of liquid in tank 114 while consistency control actuates valve 118 in solvent supply line 119 to adjust the consistency of the liquid in tank 114. The solution of bitumen and solvent with silt is removed from tank 114 by pump 120 and pipe 127 to one of a plurality of parallel connected vortex cleaners 128. Vortex cleaners 128 may be of any suitable type such as those manufactured by C-E BAUER a division of the Process Equipment Group of Combustion Engineering, Inc. under the trademark BAUERLITE CENTRI-CLEANER. Vortex cleaners 128 may also be of the type manufactured by the CELLECO COMPANY of Stockholm, Sweden under the trademark CLEANPAC. In vortex cleaners 128 and solvent and bitumen solution is separated from the silt and leaves through pipes 129 and 130 for separation and refining at 131. A slurry of silt and solution leaves vortex cleaners 128 at the bottom and is discharged into pipe 124 for admission to dilution tank 121 through valve 125. When required, the slurry of silt and solution in tank 121 may be circulated by pump 132 and piping 133 for recirculation back to pipe 124. The level in tank 121 is controlled by sensor 126 actuating valve 125 while the consistency in tank 121 is controlled by sensor 122 acting on valve 123.

The slurry of silt and solution upon proper setting of valve 125 passes through pipe 134 to a plurality of parallel connected vortex cleaners 135 where the solvent again is removed at the top of cleaners 135 by pipes 136 and 137 which connect to pipe 138 leading to refiner 131. The slurry of oil and silt and some solvent leaves cleaners 135 at the bottom by pipe 139 which connects to level control valve 140 for admission to dilution tank 141. Tank 141 includes consistency regulator 142 which actuates valve 143 in pipe 139 to supply solvent from storage tank 32 through valve 140 to tank 141. Tank 141 also has a level control 144 which actuates valve 140 to control the height of liquid in tank 141. The liquid in tank 141 may be circulated by pump 145 through pipe 146 back to pipe 139 for readmission to tank 141 or through valve 140 to pipe 147 leading to a plurality of parallel connected vortex cleaners 148. Any remaining solution in the mix with silt leaves vortex cleaners 148 at the top through pipes 149 and 150 which connects to pipe 138 and refiner 131. The silt leaves vortex cleaners 148 at the bottom through pipe 151 and is circulated through hot water tank 152 by a pump 153 connected thereto by pipe 154. The hot water in tank 152 is maintained at proper temperature by heat exchanger 155 which is connected thereto through pump 156 and piping 157. The hot water in tank 152 vaporizes any remaining solvent which then passes to condenser 158 and from condenser 158 to pipe 138. Silt is discharged from tank 152 by conveyor 159.

It will therefore be seen that clean bitumen is recovered at 131 and the solvent is recycled to storage 32 for further use in the system with clean sand and clean silt discharged from the system.

In connection with the above, where the word "solvent" is employed, it will be recognized that any suitable solvent may be used such as Hexane, Pentane, Benzene, Halogenated liquids, Xylene and others known to the art.

The several chambers 14–19 of FIGS. 1A, 1B and 1C show at 35 a suitable screw-type conveyor for moving the tar sand and solvent from one compartment to the next. FIGS. 9 and 10 show an alternate type of conveyor for this purpose of the type advertised and the trademark HYDRASIEVE SCREENS for removing solids from water as manufactured by C-E BAUER as referred to above. This conveyor could be used for each of the chambers and for purposes of illustration is shown as positioned between chamber 14 and chamber 15. The HYDRASIEVE structure is mounted at 160 in the area of discharge 161 between chamber 14 and chamber 15 and is fed with the slurry of tar sand and solvent from the bottom of tank 14 through pump 162 which supplies the slurry to pipe 163 and to the HYDRASIEVE structure at 164. The intake 165 of pump 162 is kept open by a jet of solution of bitumen and solvent removed from the mid-area of chamber 14 by pipe 166 and forced under high pressure by pump 167 through pipe 168 which discharges into pump intake 165.

The HYDRASIEVE structure 160 separates the solution of bitumen and solvent from the sand with the solution of bitumen and solvent falling downwardly at 169 into chamber 14 while the sand and remaining bitumen discharges into chamber 15 and 170.

With the apparatus of the present invention set up and connected as above described, the present novel and inventive method is practised by first filling chambers 14–18 with a mixture of one-third tar sand and two-thirds solvent through pipe 27 and connections 26. The stirrers or agitators 59 are then put in motion and conveyors 35 rotated at the same time that conveyor 13 is started to bring fresh tar sand to discharge at the top of chamber 14. Suitably heated solvent is then brought from storage 32 by pump 98 through heater 94 and pipe 93 to the bottom of chamber 18 for countercurrent flow of solution of solvent and bitumen to the direction of movement of the sand, bitumen and solvent. Pumps 63 are put in operation to circulate in each tank 14–18 the solution of bitumen and solvent from the top of each tank through heater 64 for adjusting the heat from 110°±15° F. and for reintroduction into the bottom of each of the chambers. The stirring action in each chamber improves the removal of the bitumen from the sand by the solvent and the bitumen solvent solution rises to the top of each chamber while the tar sand partially depleted of bitumen with some solvent is taken by each conveyor 35 for discharge into the next chamber. Pressure of the vapor of the solvent is maintained equal above each chamber by pipes 43 and valves 44 and the solvent vapor is removed from the top of each chamber and then condensed in condensers 46 for reuse in the apparatus. Any water collecting at the bottoms of chambers 14–17 is removed by pipes 70 and treated for removal of the solvent which solvent is then again stored for use in the apparatus. The bitumen and solvent solution flows counter to the direction of movement of the tar sand through pipes 57 and is enriched in bitumen as it progresses towards the chamber 14 while the tar sand is progressively depleted of bitumen until it reaches chamber 19 where the sand is treated with hot water supplied by pipe 100 to separate the solvent as a vapor for condensation in the corresponding condenser 46 and for reuse in the apparatus. The enriched bitumen and solvent solution is removed from the top of chamber 14 through pipe 84 and pump 86 and also, when desired, from the top of chamber 15 by pipe 88 connecting to pump 86.

The enriched solution of bitumen and solvent with silt is taken by pump 86 to holding tank 110 and thence to tank 114 for suitable dilution for presentation to vortex cleaners 128 where the solvent and bitumen are extracted at the tops thereof and sent to refiner 131. The slurry of silt and some solvent and bitumen is then taken to a second dilution tank 121 for adjustment of viscosity and then to vortex cleaners 135 where additional solvent and bitumen is removed to refiner 131. A third stage takes the silt solvent and bitumen to a third dilution tank for consistency adjustment and then to vortex cleaners 148 where further solution of solvent and bitumen is removed to refiner 131 and the silt and remaining solvent passes to hot water tank 152 where the last of the solvent is removed and condensed at 158 for return to the solvent supply and the now cleaned silt is discharged from the system.

What I claim is:

1. Apparatus for extracting bitumen from tar sand comprising a plurality of sealed extraction chambers in series including a first chamber, a last chamber and a washing chamber, means for charging said extraction chambers with a mixture of approximately one third tar sand and two thirds solvent, means for supplying tar sand to said first chamber, means for supplying solvent to said last chamber, means in each of said extraction chambers for moving tar sand and solvent from adjacent the bottom thereof to the top for discharge into the next adjacent extraction chamber, the movement of tar sand through said extraction chambers being in opposite direction to the flow of solvent through said extraction chambers, a common liquid level of a solution of bitumen and solvent in said extraction chambers, conduit means connecting adjacent ones of said extraction chambers at said liquid level, means for each of said extraction chambers for removing and condensing solvent vapor from above said liquid level for reuse of the condensed solvent, said washing chamber receiving sand and solvent from said last extraction chamber, means for supplying hot water to said washing chamber for removal of solvent from the sand as a vapor, means for condensing the solvent vapor from said washing chamber for reuse, conveyor means discharging clean sand from said washing chamber, means for removing a solution of solvent enriched in bitumen from adjacent the liquid level in said first extraction chamber, centrifugal means receiving the enriched solution and for separating a solution of solvent and bitumen from silt, means for separating the solvent from the silt as a vapor and means for condensing the last named solvent vapor for reuse in the apparatus.

2. Apparatus for extracting bitumen from tar sand comprising a plurality of sealed extraction chambers in series including a first chamber, a last chamber and a washing chamber, means for charging said extraction chambers with a mixture of approximately one third tar sand and two thirds solvent, means for supplying tar sand to said first chamber, means for supplying solvent to said last chamber, means in each of said extracting chambers for moving tar sand and solvent from adjacent the bottom thereof to the top for discharge into the next adjacent extraction chamber, the movement of tar sand through said extraction chambers being in opposite direction to the flow of solvent through said extraction chambers, a common liquid level of a solution of bitumen and solvent in said extraction chambers, conduit means connecting adjacent ones of said extraction chambers at said liquid level, means for each of said extraction chambers for removing and condensing solvent vapor from above said liquid level for reuse of the condensed solvent, said washing chamber receiving sand and solvent from said last extraction chamber, means for supplying hot water to said washing chamber for removal of solvent from the sand as a vapor, means for condensing the solvent vapor from said washing chamber for reuse, conveyor means discharging clean sand from said washing chamber, means for removing a solution of solvent enriched in bitumen from adjacent the liquid level in said first extraction chamber, centrifugal means receiving the enriched solution and for separating a solution of solvent and bitumen from silt, means for separating the solvent from the silt as a vapor and means for condensing the last named solvent vapor for reuse in the apparatus, each of said extraction chambers having a mixer adjacent a bottom thereof, conduit means including a pump and a heater for circulating a solution of solvent and bitumen for each of said extraction chambers from adjacent said liquid level therein to adjacent said mixer, said heater adjusting the temperature of the circulating solution to $110° \pm 15°$ F.

3. Apparatus as described in claim 2 further including a heater for the solvent supplied to said last extraction chamber adjusting the temperature of the solvent to $110° \pm 15°$ F.

4. Apparatus as described in claim 2, said means in each of said extraction chambers for moving tar sand and solvent being a screw conveyor removing the tar sand and solvent from adjacent said mixer with discharge into the next adjacent chamber, the tar sand prior to discharge forming a seal between the adjacent chambers.

5. Apparatus as described in claim 1, said centrifugal means including a plurality of stages of vortex cleaners, each of said stages including a plurality of vortex cleaners connected in parallel and said stages being connected in series and means for each of said stages for supplying solvent to the solution of solvent and bitumen for adjusting the viscosity of the solution.

* * * * *